US006976105B1

(12) United States Patent
Wright

(10) Patent No.: US 6,976,105 B1
(45) Date of Patent: Dec. 13, 2005

(54) APPARATUS AND METHOD FOR ATTACHING MULTIPLE DEVICES TO A HOST

(75) Inventor: David G. Wright, Escondido, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 387 days.

(21) Appl. No.: 10/317,775

(22) Filed: Dec. 11, 2002

(51) Int. Cl.⁷ .............................................. G06F 13/00
(52) U.S. Cl. ......................................... 710/104; 710/9
(58) Field of Search ........................... 710/8, 9, 10, 104

(56) References Cited

U.S. PATENT DOCUMENTS

| | | | | |
|---|---|---|---|---|
| 5,987,533 | A * | 11/1999 | Hong .............................. 710/9 |
| 6,389,495 | B1 * | 5/2002 | Larky et al. .................... 710/8 |
| 6,415,343 | B1 * | 7/2002 | Fensore et al. .............. 710/104 |
| 6,671,765 | B1 * | 12/2003 | Karlsson et al. ............. 710/310 |
| 6,745,270 | B1 * | 6/2004 | Barenys et al. .............. 710/104 |
| 6,751,682 | B1 * | 6/2004 | Stirling ........................... 710/9 |
| 2002/0156952 | A1 * | 10/2002 | Shono .......................... 710/104 |
| 2003/0041205 | A1 * | 2/2003 | Wu et al. ..................... 710/302 |
| 2004/0225811 | A1 * | 11/2004 | Fosler .......................... 710/305 |

* cited by examiner

*Primary Examiner*—Glenn A. Auve
(74) *Attorney, Agent, or Firm*—Marger Johnson & McCollom, PC

(57) ABSTRACT

A concentrator connects multiple downstream devices to an upstream host using the same device address. The concentrator combines together configuration information obtained from the multiple downstream devices. The combined information appears to the host as coming from the same device. Multiple peripheral controllers may be configured to respond to different endpoints or alternate interfaces associated with the same device address. In one implementation, the downstream devices, the concentrator, and the upstream host all communicate using Universal Serial Bus (USB) connections.

19 Claims, 6 Drawing Sheets

APPARATUS AND METHOD FOR ATTACHING MULTIPLE DEVICES TO A HOST

BACKGROUND AND RELATED ART

The Universal Serial Bus (USB) specification defines a communications architecture for connecting a host computer with peripheral devices. Many electronic devices use USB interfaces, such as wireless networking devices, modems, scanners, speakers, portable or external media storage devices (disk drives, music players, optical drives, etcetera), monitors, keyboards, joysticks, and printers. These USB devices are categorized into various device classes including display devices, Human Interface Devices (HIDs), audio devices, mass storage devices, and communication devices.

The USB specification allows only 127 devices to be attached to the same USB host. This 127 device limit also includes hubs. Thus, for practical purposes, only around 100 USB peripheral devices can be attached to the same USB host. The 127-device limit becomes a constraint in some USB applications.

For example, hundreds of devices may need to be tested by the same computer at the same time. It may be desirable to test these devices through USB connections. However, the restricted number of devices that can be simultaneously connected to the USB host limits the viability of using USB in certain test and measurement applications.

SUMMARY

A concentrator connects multiple downstream devices to an upstream host using the same device address. The concentrator combines together configuration information obtained from the multiple downstream devices. The combined information appears to the host as coming from the same device. Multiple peripheral controllers may be configured to respond to different endpoints or alternate interfaces associated with the same device address. In one implementation, the downstream devices, the concentrator, and the upstream host all communicate using Universal Serial Bus (USB) connections.

Additional features and advantages of the concentrator will be set forth in the description that follows, and in part will be obvious from the description, or may be learned by the practice of the concentrator. The features and advantages of the concentrator may be realized and obtained by means of the instruments and combinations particularly pointed out in the appended claims. These and other features of the concentrator will become more fully apparent from the following description and appended claims, or may be learned by the practice of the concentrator as set forth hereinafter.

BRIEF DESCRIPTION OF THE DRAWINGS

The embodiments of the invention are illustrated by way of example, and not by way of limitation, in the figures of the accompanying drawings in which like reference numerals refer to similar elements. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
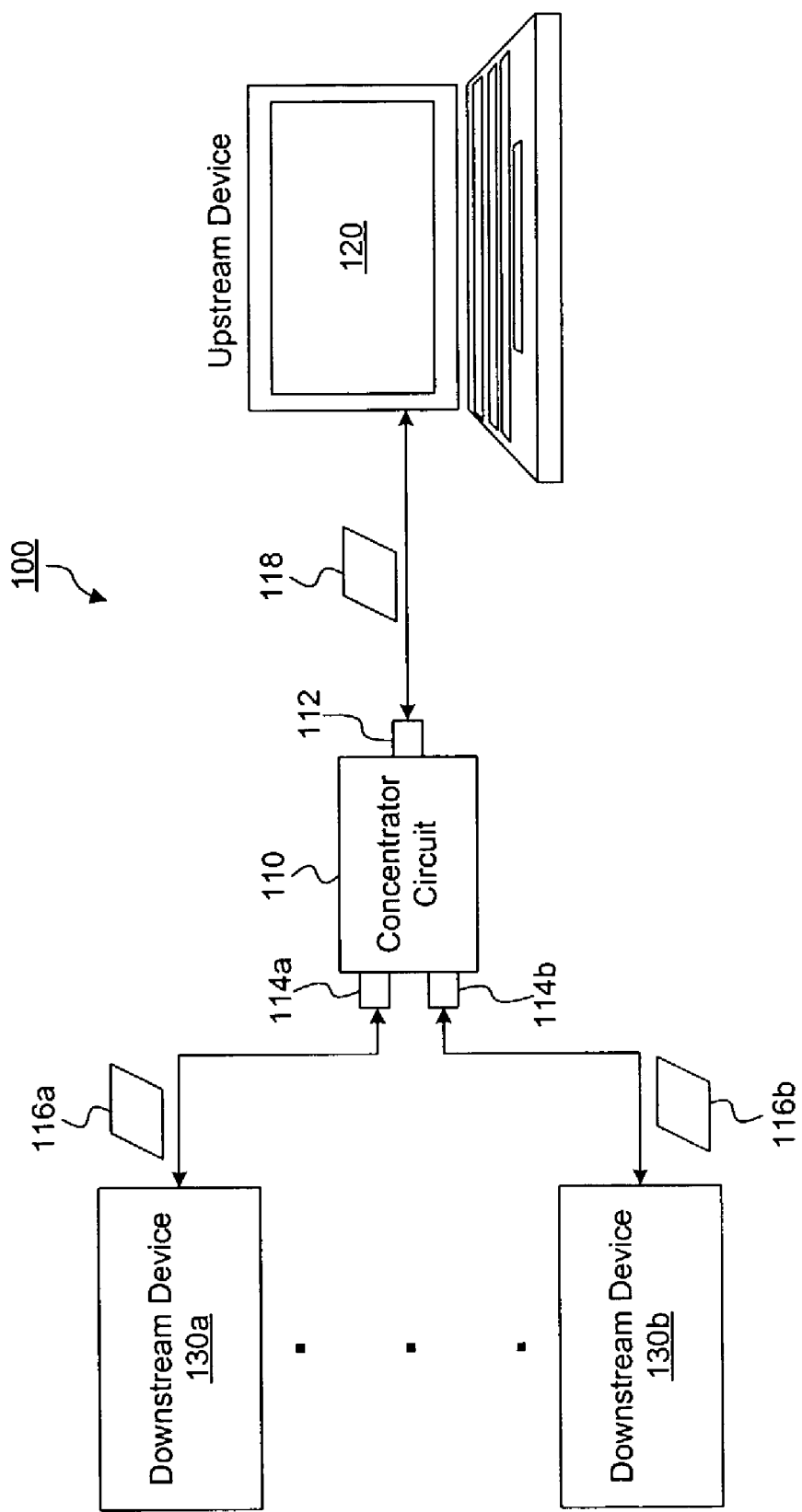
FIG. 1 shows a system for connecting devices to a host.

FIG. 1 shows a concentrator circuit 110 having an upstream port 112 for communicating with a host or upstream device 120. Multiple downstream ports 114 communicate with multiple peripherals or downstream devices 130. The concentrator circuit 110 presents the multiple downstream devices 130A and 130B as a single downstream device to the upstream device 120. The configuration data 116A and 116B for the individual downstream devices 130A and 130B, respectively, are combined by concentrator circuit 110 into one set of combined configuration data 118. The combined configuration data 118 is sent by the concentrator circuit 110 to the upstream device 120.

In one embodiment, the host 120 enumerates the concentrator circuit 110 using a single device address while still maintaining the combined operational characteristics 118 of the multiple downstream devices 130. Enumeration is the process of assigning and managing device addresses within a system. More specifically, enumeration in USB is a process in which the host obtains information about the peripheral device and configures the peripheral device into a normal operating mode.

In a Universal Serial Bus (USB) embodiment, the upstream port 112 and the multiple downstream ports 114 are USB ports. The upstream device 120 may be a USB compatible host and the multiple downstream devices 130 may be multiple USB compatible peripheral devices. The concentrator circuit 110 operates as a USB host when communicating with the multiple USB peripheral devices 130 and operates as a USB peripheral device when communicating with the upstream USB host 120.

Figure 2:
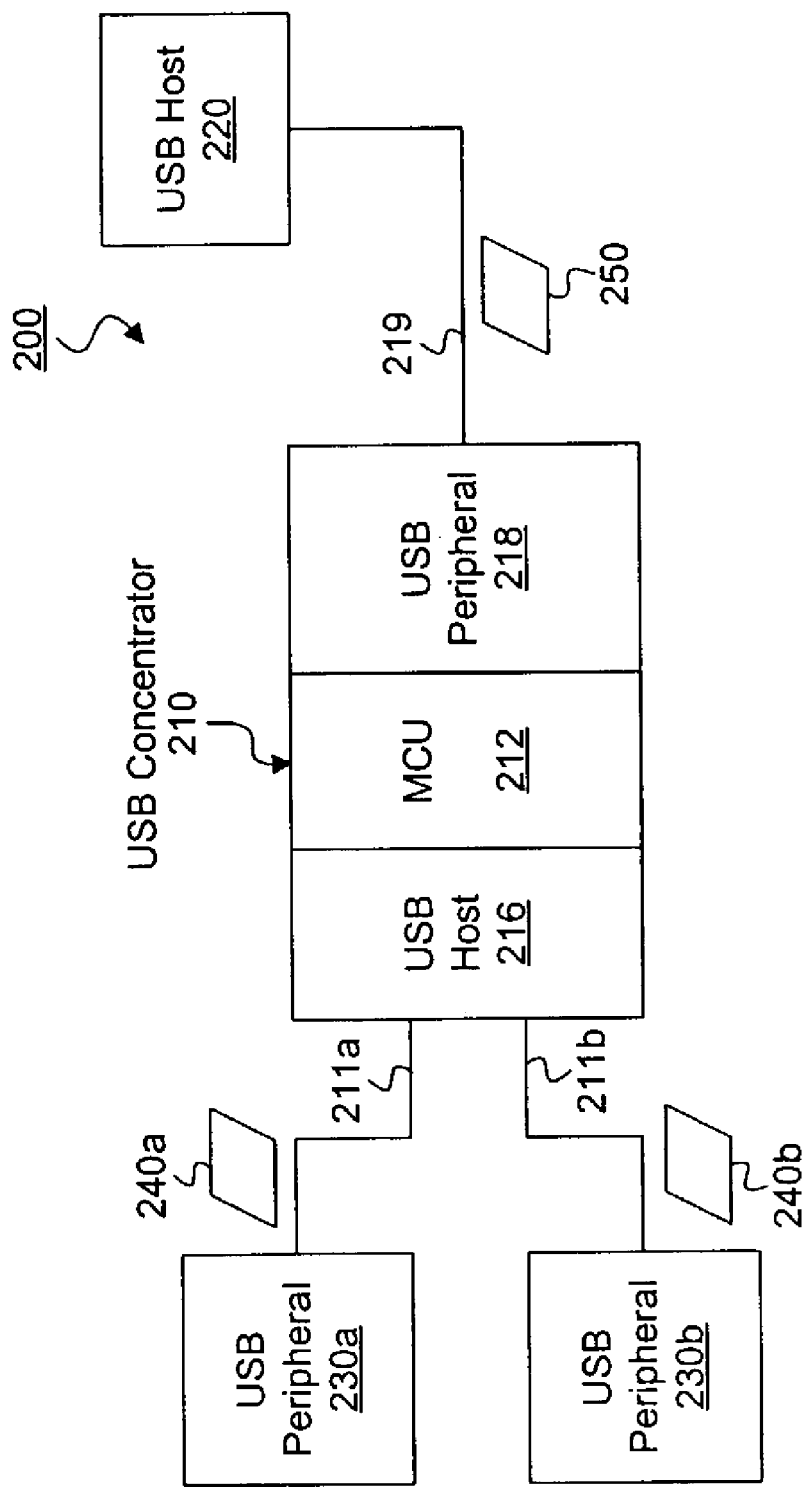
FIG. 2 shows a USB peripheral concentrator.

FIG. 2 is a block diagram showing in more detail the concentrator circuit used for a USB system 200. The USB system 200 includes a USB concentrator 210, a USB host 220, and multiple USB peripheral devices 230. The USB host 220 enumerates the USB concentrator 210 using a common device address for multiple attached USB peripheral devices 230.

The USB concentrator 210 includes a Micro Controller Unit (MCU) 212. A USB host interface 216 is coupled to the MCU 212 and includes multiple USB ports 211 for communicating with the multiple USB peripheral devices 230. A USB peripheral interface 218 includes a USB port 219 for communicating with the USB host 220.

The USB concentrator 210 combines configuration data 240A and 240B received from the multiple USB peripheral devices 230. The combined configuration data is reported as a single set of configuration data 250 to the USB host 220. By combining the configuration data 240A and 240B, the multiple USB peripheral devices 230A and 230B appear as a single USB device to the USB host 220.

The USB concentrator 210 includes at least two independent USB Serial Interface Engines (SIEs). Each SIE can be configured as either a USB host interface 216 or as a USB peripheral interface 218. Generally, the upstream interface appears as a peripheral and the downstream interface appears as a host. For example, the SIE connected to the ports 211 is configured as the USB host interface 216 and the other SIE connected to the port 219 is configured as the USB peripheral interface 218.

An upstream USB device is generally responsible for configuring a downstream USB device. The upstream hosts 220 and 216 request the configuration data 250 and 240 from associated downstream devices 210 and 230, respectively. The USB concentrator 210 configures the USB peripheral devices 230 using the configuration data 240 and the USB host 220 configures the USB concentrator 210 using the combined configuration data 250. The USB peripheral interface 218 can support multiple interfaces through the MCU 212.

There are many different ways to assemble the combined configuration data 250 for a group of downstream devices 230. In one embodiment, the concentrator 210 enumerates itself as a USB peripheral device having at least as many endpoints as the sum of all the endpoints associated with the attached multiple USB peripheral devices 230A and 230B. The MCU 212 assigns unique USB endpoints to the USB peripheral device reported upstream, each assigned endpoint corresponding to one of the endpoints of the USB peripheral devices 230A and 230B.

The USB host 220 may run a filter device driver. The USB peripheral interface 218 reports the USB endpoints associated with the downstream peripheral devices 230 to the USB host 220 as a single set of endpoints belonging to a single USB device. Once the USB concentrator 210 has been enumerated and configured by the USB host 220, the filter device driver separates received payload data into multiple "virtual" devices that appear to the operating system as multiple data streams from multiple devices. Separating the combined payload data into multiple data streams allows software applications running on the USB host 220 to identify each of the multiple USB peripheral devices 230.

In another embodiment, the concentrator 210 enumerates itself as a USB peripheral device having multiple alternate interfaces. Each interface is generated by the USB concentrator 210 to correspond with one of the attached multiple peripheral devices 230. In this configuration, each alternate interface has a set of endpoints corresponding to the set of endpoints used by each peripheral device 230. The MCU 212 routes data to/from the endpoints of the USB peripherals 230 depending on which interface has been selected as being active by the USB Host 220. A filter device driver running on the upstream USB host 220 may separate received payload data from the USB concentrator 210 into multiple data streams from multiple "virtual" devices based on the alternate interfaces, once the USB concentrator 210 has been enumerated and configured by the USB host 220.

Figure 5:
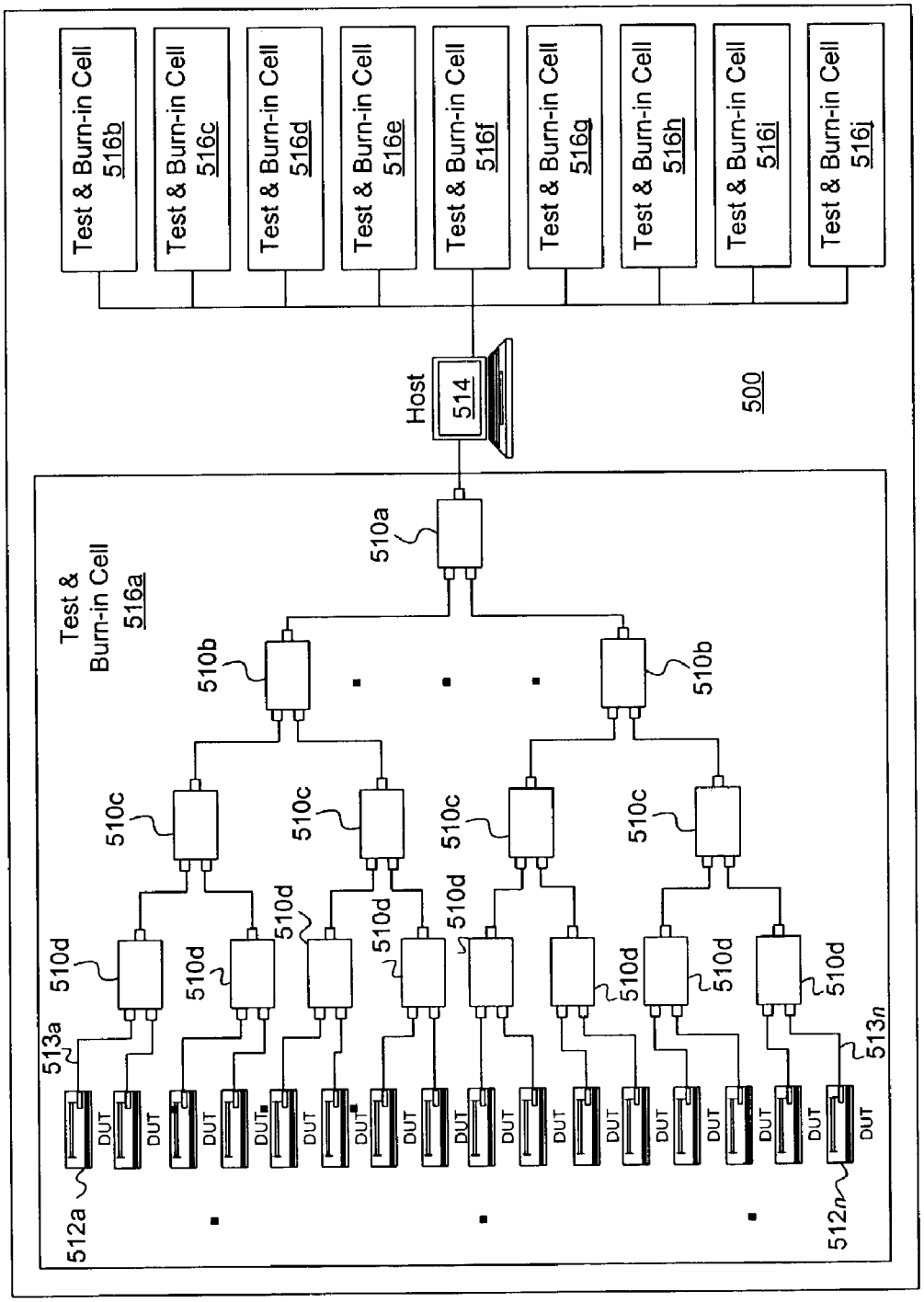
FIG. 5 shows a test system.

FIG. 2 only illustrates one USB concentrator 210. In another configuration, one or more USB hubs can be connected to the downstream ports 211. Other USB peripheral devices 230 or other USB hubs can then be connected to the USB hub that is connected to USB concentrator 210. This allows more than two devices to be connected to each downstream port 211. In another embodiment, another USB concentrator is coupled to one of the downstream ports 211 of USB concentrator 210 as shown in FIG. 5 below.

Figure 3A:
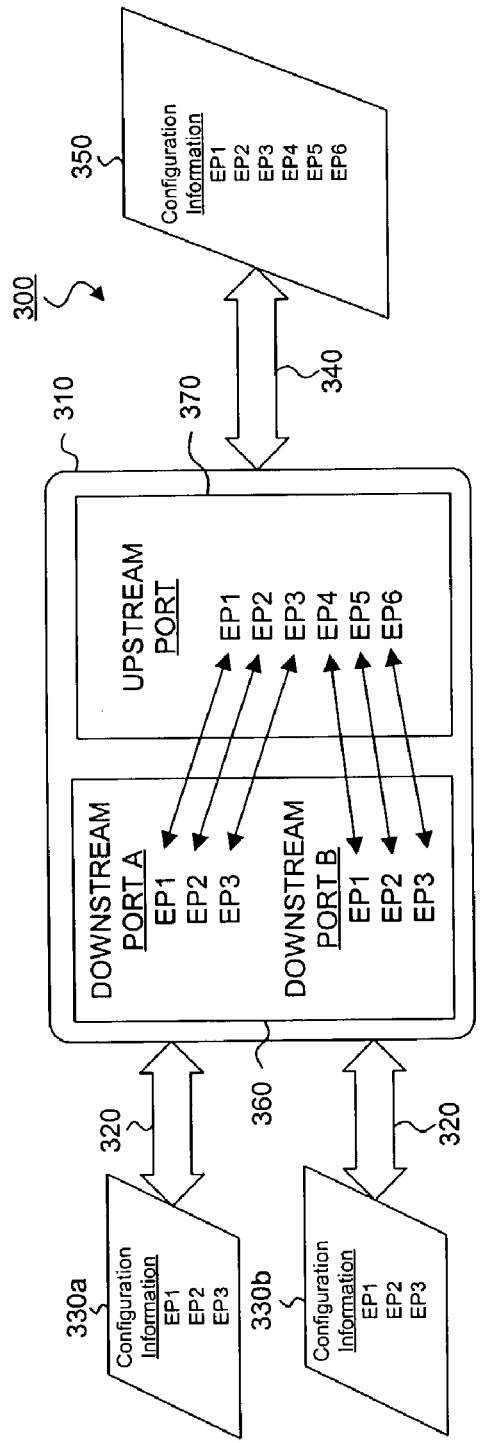
FIGS. 3A & 3B shows device descriptor combination.
Figure 3B:
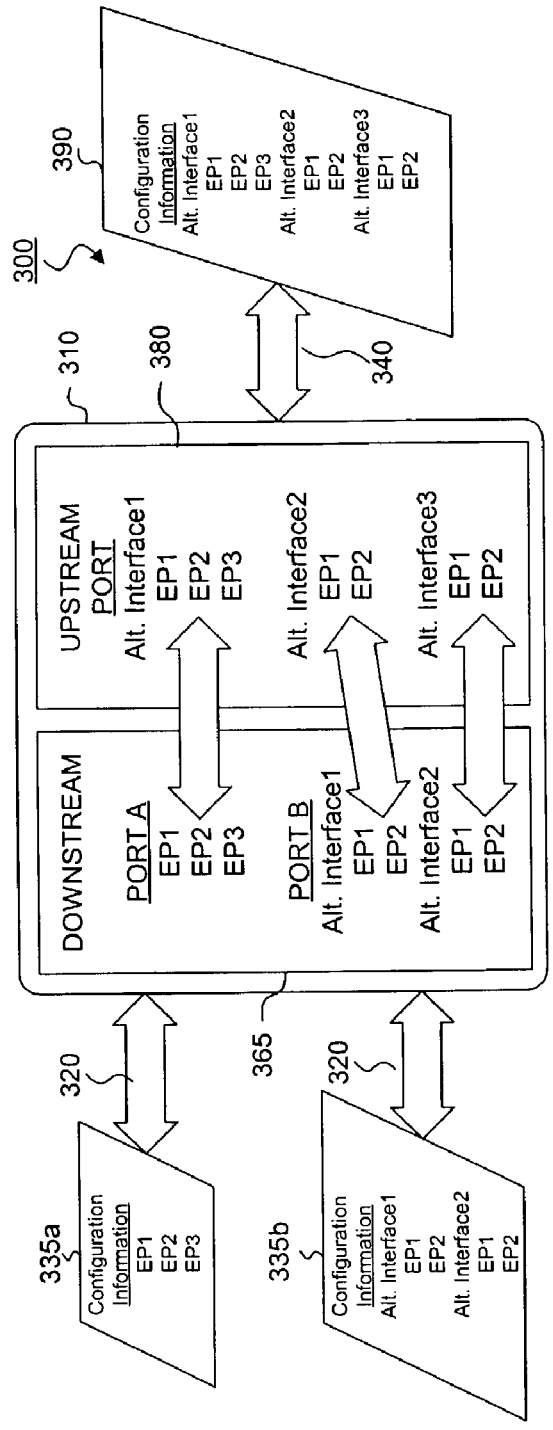

FIG. 3A & FIG. 3B are block diagrams showing in more detail the combination of configuration data by the concentrator circuit for use by a USB system 300. The USB system 300 includes a concentrator 310 having multiple host communication channels 320 for receiving configuration data 330 and 335 from downstream devices and a peripheral communication channel 340 for sending configuration data 350 and 390 to upstream devices. The concentrator 310 may also include downstream configuration descriptors 360 and 365 and upstream configuration descriptors 370 and 380 illustrating representative algorithmic modifications that the concentrator 310 may perform on received configuration data. The downstream configuration descriptor 360 and 365 dynamically links downstream configuration data to upstream configuration data reported by the upstream configuration descriptors 370 and 380.

In one embodiment, the configuration data 330 includes configuration information containing device descriptors that describe the number and format of endpoints used by the devices attached downstream from the concentrator 310. Endpoints each represent a termination of a data pipe between the downstream device and the upstream host.

FIG. 3A illustrates the concentrator 310 concatenating received configuration data 330 into one device with multiple unique endpoints. The downstream configuration descriptor 360 links endpoints of downstream port A with endpoints, EP1–EP3, of the upstream port in the upstream configuration descriptor 370. Similarly, endpoints of downstream port B are linked with endpoints, EP4–EP6, of the upstream port. As such, the concentrator 310 combines the endpoints into a single device that is reported to the upstream host using combined configuration data 350. Once the enumeration process is completed the upstream host may communicate with all of the endpoints simultaneously. Presently, the USB specification limits the number of endpoints that may be associated with a single USB peripheral device to 15 IN endpoints and 15 OUT endpoints in addition to the default configuration endpoint, EP0.

FIG. 3B illustrates the concentrator 310 generating alternate interfaces for each detected downstream device configuration. More specifically, FIG. 3B illustrates how the upstream configuration descriptor 380 can report multiple alternative interfaces for devices attached to the downstream ports through the downstream configuration descriptor 365. Each alternative interface has an associated set of endpoints. In one embodiment, the configuration data 335a received from downstream port A is associated with alterative interface1 and configuration data 335b is associated with alterative interface2 and alternative interface3. The alternative interface descriptors are combined and reported by the upstream configuration descriptor 380 during enumeration to an upstream host as configuration data 390 for a single device. Once enumeration is complete, the upstream host may select an interface and communicate exclusively with that interface until another interface is selected.

The upstream host communicates with a specific downstream device by identifying the desired alternative interface associated with the downstream device. The upstream host then uses the alternate settings designated by the desired alternative interface to configure communications through the concentrator 310. By selecting a given interface, the concentrator 310 will route the communications from the upstream host to the appropriate downstream device.

Within the configuration data 335, each alternate interface may be identified by an interface descriptor. The interface descriptor contains fields that identify the interface number and available alternate settings. The alternate settings of the interface descriptor help describe operable configurations of the downstream devices. In a USB compatible embodiment, multiple alternate interfaces can be assigned to the same downstream device. Each alternate interface may be associated with one operable configuration of the downstream device. Configuration data 335*b* illustrates a downstream device reporting multiple alternate interfaces, Alt. Interface1 and Alt. Interface2.

The combined configuration data 390 may contain alternate interfaces for multiple downstream devices (Alt. Interface1 and Alt. Interface2/3) and for various configurations (Alt. Interface2 and Alt. Interface3) of those downstream devices. In this manner, by choosing a specific alternate interface, the host selects a device and the device configuration. The alternate interfaces allow the USB concentrator 310 to route communication to the specific downstream device and the specific device configuration using the same device address.

Many different configurations may be used by the concentrator 310 to generate the configuration data 390. For example, one alternative configuration uses portions of the downstream configuration data 335 to create each alternative interface, such as combining all of the first endpoints. Another configuration combines functionally similarly endpoints into common alternative interfaces, such as combining all the IN or OUT endpoints.

The protocol used for communicating with a related set of endpoints and the configuration of each endpoint within the interface may be specified as part of a device class or vendor-specific definition. These device class or vendor-specific definitions may be included in the configuration data 335 provided by the downstream devices.

Figure 4:
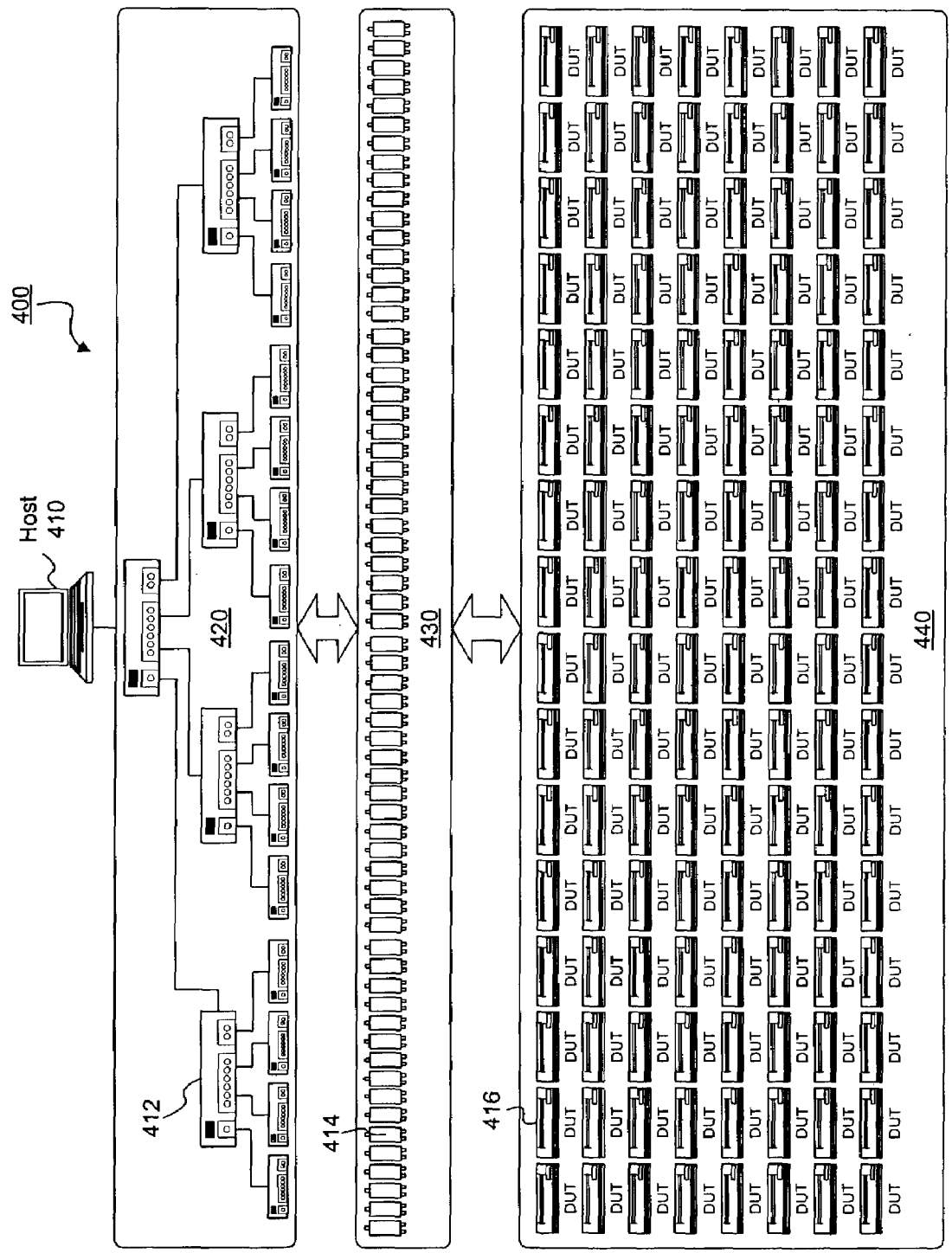
FIG. 4 shows a test and burn-in control system.

FIG. 4 shows a test system 400 designed to test, operate and monitor multiple Devices Under Test (DUTs) 416. The system 400 includes a host 410 and multiple layers, such as a routing layer 420, a concentrating layer 430, and the test layer 440.

The host 410 may be a personal computer, a computer server, or any other type of computing device that is able to monitor, test, or operate the DUTs 416. A USB host controller may assign up to 127 unique device addresses, one device address for each reported USB device in the system 400.

The illustrated routing layer 420 includes multiple USB hubs 412, each hub having one upstream USB port and four downstream USB ports. The routing layer 420 provides multiple USB communication channels for the concentrators 414 in the concentrating layer 430. In one embodiment, the routing layer 420 also includes other network devices, such as routers, switches, servers, concentrators, port replicators, and other network switching devices. In the illustrated configuration, the routing layer 420 includes twenty-one hubs and may use about twenty-one device addresses to generate the necessary communication channels for the concentrating layer 430. The illustrated configuration includes three complete routing layers. Larger configurations may also include a partial $4^{th}$ layer of hubs to increase the number of available communication channels. The routing layer 420 reduces the complexity of the data compression in the concentrating layer 430 by providing sufficient downstream ports for a single layer of concentrators 414. Among other things, keeping the concentrators 414 on a single layer removes more complex recursive calculations in the concentration layer 430.

The concentrating layer 430 includes multiple concentrators 414 similar to those previous described. Each concentrator 414 includes an upstream port for communicating with an upstream device and multiple downstream ports for communicating with multiple downstream devices. The concentrator 414 reports the multiple downstream devices upstream as a single downstream device to the host 410. The host 410 typically assigns one device address to each concentrator 414, but has access to all of the attached downstream DUTs.

In one embodiment, each concentrator 414 is attached to at least two downstream DUTs 416. The illustrated configuration of the concentrating layer 430 uses about sixty-four concentrators and device addresses. This configuration enables the entire system 400 to test more devices than previously allowed with USB compatible systems. As previously mentioned, other routing configurations may allow for additional concentrators 414 to be added to the concentrating layer 430 without increasing the complexity of the system 400.

In one example, the DUTs 416 are hard disk drives. Similar configurations can be used for connecting or testing any other type of USB compatible electronic device. For example, the test system 400 can be used for testing computer peripherals, wireless networking devices, modems, scanners, speakers, portable or external media storage devices (disk drives, music players, optical drives, etcetera), monitors, cameras keyboards, joysticks, and printers. The testing layer 440 may also include non-electronic devices, where the DUTs are test nodes monitored by the host 410 within a controlled testing environment.

FIG. 5 shows a test system 500 designed to test and burn-in multiple DUTs 512. The system 500 uses multiple concentrators 510 to connect the DUTs 512 to a host 514. The host 514 may be a personal computer, a computer server, or any other type of computing device that is able to test the DUTs 512. Groups of concentrators 510 are arranged into multiple test and burn-in cells 516. Control and testing of the DUTs 512 within each cell 516 may be performed using USB connections 513.

In one example, the host 514 varies the power levels supplied to the DUTs 512. The host 514 then monitors the operation of the devices at the different power levels. In one embodiment, the operation of the DUTs 512 is reported for the different power levels using generic USB OUT and IN endpoints.

In another example, the host 514 regulates the temperature levels in the rooms containing the DUTs 512. The host 514 then runs tests in the DUTs 516 and monitors the operation of the DUTs at the different temperatures. USB connections 513 are used for initiating the tests and transferring test data between the DUTs 512 and host 514. Of course these are only a few examples of tests that can be performed using the system 500 shown in FIG. 5. The system 500 may also be used for testing environmental variation, networking capabilities, and data transfer for non-USB devices. For example, the concentrators may be used for communicating with devices that use a Small Computer System Interface (SCSI) or some other protocol. Alternatively, the concentrators may be associated with test nodes that test and burn-in non-USB DUTs.

Typically, test and burn-in applications do not heavily load a Central Processing Unit (CPU) in the host 514 and do not use a large amount of the bandwidth on the USB connections 513. Therefore, one host 514 has the capacity to manage testing for many DUTs 512 at the same time. Previously, the number of DUTs 512 that could be tested at the same time was limited by the number of addressable devices in the USB protocol. However, as described above, the concentrators 510 allow more DUTs 512 to be connected to the same host 514.

The number of devices 512 that can efficiently be connected to host 514 may be limited by the overall number of concentrators 510A–510D that operate as routing nodes for lower level downstream concentrators. For example, concentrator 510A operates as a routing node for two downstream concentrators 510B. Each concentrator 510B operates as a routing node for two downstream concentrators 510C, etc.

The host 514 may manage an environmental cell 516A that has a large number of routing nodes. This large number of routing nodes may require more network management processing by the host 514 and may use require more bandwidth on the USB connections 513. To reduce these possible overhead concerns, alternative configurations may have host 514 managing more cells 516B–516J at a first level that each have a smaller number of routing nodes.

In the configurations described above, the addresses for the concentrators 510A may be assigned by the host. However, the addresses for the peripheral devices or DUTs 512 may not be set by the host 514 or assigned by the concentrator 510. For example, one or more of the device addresses may be set using I/O pins or jumper settings on the peripheral device itself. This makes it possible for the firmware of each DUT 512 to be kept identical.

Monitoring software could obtain the set address from the preconfigured peripheral device or the device could use an address already known to the monitoring host. In this case, each monitoring concentrator 510d may include multiple specially configured peripheral controllers that would recognize the preconfigured peripheral devices without applying the enumeration process. Data could be routed to the specific DUT 512 based on which alternate configuration is selected by the host.

Preconfigured peripheral devices sharing the same address are programmed to respond only to requests for the endpoint(s) they are programmed to service. The concentrator 510 enumerates itself as a USB peripheral device having at least as many endpoints as the sum of all the endpoints associated with the attached preconfigured peripheral devices. The concentrator 510 then assigns each reported endpoint to one of the endpoints of the preconfigured peripheral devices attached to the concentrator 510. Requests to assigned endpoints are routed to the corresponding DUT 512. For example, a first peripheral device may responds to EP1, a second peripheral device with the same device address is assigned to respond to EP2, etc. Requests to any unassigned endpoint are ignored by the concentrator 510.

Operations described above may be implemented in computer software or hardware. The methods can be performed by digital logic or computer programs made up of computer-executable instructions. Computer-executable instructions may be written in a computer programming language or may be embodied in firmware logic. If written in a programming language conforming to a recognized standard, such instructions can be executed on a variety of hardware platforms and for interfaces to a variety of operating systems.

A variety of programming languages may be used to implement the system as described herein. Furthermore, it is common in the art to speak of software, in one form or another (e.g., program, procedure, process, application . . . ), as taking an action or causing a result. Such expressions are merely a shorthand way of saying that execution of the software by an electronic device causes the processor of the computer to perform an action or a produce a result.

Figure 6:
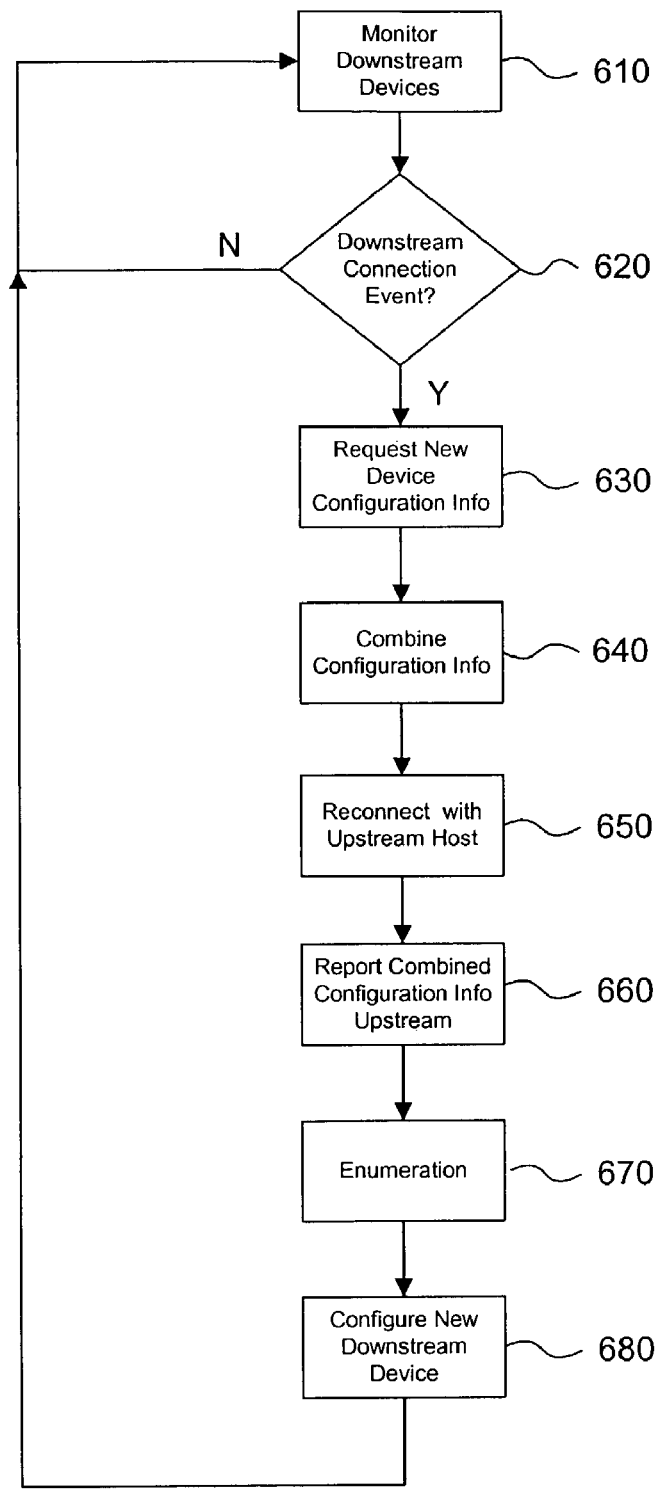
FIG. 6 is a flowchart showing a device concentration process

FIG. 6 is a flowchart showing the operations performed by one of the concentrators described above. Block 610 monitors the downstream devices for bus activity and configuration information. Upon detecting a connection event in query block 620, the concentrator requests new device configuration information in block 630.

In a USB compatible embodiment, once a downstream device is coupled to a downstream port from the concentrator a connection event will be detected. The downstream device receives a bus reset signal from the concentrator and then responds to a configuration request from the upstream device. The default device address is used to initially communicate with the recently connected downstream device.

Once configuration information is received from the new downstream device, the concentrator combines the configuration information from the attached downstream devices into a single virtual meta-peripheral device in block 640. The concentrator then disconnects and reconnects with the upstream host in block 650. Upon reconnecting with the upstream host, the concentrator reports the combined configuration information to the upstream host in block 660.

The host may then initiate an enumeration process in block 670, upon receiving the combined configuration information. As previously discussed, the enumeration process allows the host to obtain information about the single virtual meta-peripheral device and configure the concentrator into normal operating mode.

The concentrator configures the new downstream device in block 680. As previously discussed, this process typically links endpoints from the downstream device with endpoints reported to the upstream host. As previously discussed this linking process can be accomplished in many different ways. For example, the concentrator may add the endpoints of the new downstream device to the other endpoints. Another embodiment allows the concentrator to link one or more alternative interfaces with the new downstream device. Each alternative interface assigned to the downstream device configures the downstream device to function in various operating modes, such as the normal operating mode.

Once the downstream devices are configured in block 680, the concentrator continues to monitor the downstream devices for configuration changes in block 610. This allows the concentrator to dynamically adjust the combined configuration information used for communicating with the upstream host.

The present invention may be embodied in other specific forms without departing from its spirit or essential characteristics. The described embodiments are to be considered in all respects only as illustrative and not restrictive. Therefore, the scope of the invention is indicated by the appended claims rather than by the foregoing description. All changes that come within the meaning and range of equivalency of the claims are to be embraced within their scope.

What is claimed is:

1. An apparatus comprising:
   a concentrator configured to enumerate multiple devices using a common Universal Serial Bus (USB) device address, wherein the common USB device address does not include a USB default address.

2. The apparatus of claim 1 wherein the concentrator enumerates itself as a USB peripheral device having a number of endpoints associated with the multiple devices.

3. The apparatus of claim 1 wherein the concentrator enumerates itself as a USB peripheral device having multiple individual interfaces each associated with one of the multiple devices.

4. The apparatus of claim 1 wherein the concentrator combines data coming from the multiple devices into a single data set appearing to a host as coming from a single device.

5. The apparatus of claim 1 wherein the concentrator includes:
- a Micro Controller Unit (MCU);
- a Universal Serial Bus (USB) peripheral Interface coupled to the MCU and having a USB port for communicating with a USB host; and
- a USB host interface coupled to the MCU having multiple USB ports for communicating with multiple USB peripheral devices.

6. The apparatus of claim 5 wherein the MCU is configured to combine data received from the USB host interface ports into a data package associated with a single USB device and deliver the data package to the USB host over the USB peripheral interface port.

7. The apparatus of claim 6 wherein the MCU assigns unique USB endpoints to the devices attached to the USB host interface ports.

8. The apparatus of claim 6 wherein the MCU assigns alternate interfaces to the devices attached to the USB host interface ports.

9. A system comprising:
- a circuit having an upstream port for communicating with an upstream device and multiple downstream ports for communicating with multiple downstream devices, the circuit reporting the multiple downstream devices to appear as a single downstream device to the upstream device.

10. The system in claim 9 wherein the upstream port and the downstream ports are Universal Serial Bus (USB) ports.

11. The system in claim 10 wherein the upstream device is a USB host.

12. The system in claim 11 wherein the multiple downstream devices are USB peripheral devices.

13. The system in claim 12 wherein the circuit enumerates the USB peripheral devices as a single USB device with a single USB address.

14. The system in claim 13 wherein the circuit enumerates the multiple USB peripheral devices as different USB interfaces or different USB endpoints for the same USB address.

15. A method comprising:
- configuring different Universal Serial Bus (USB) devices to respond to a same USB device address, wherein the USB device address is not a USB default address.

16. The method of claim 15 including:
- enumerating the USB devices through a first USB host;
- enumerating the first USB host with the same USB device address through a second upstream USB host; and
- transceiving data with the USB devices using the same USB device address.

17. The method of claim 15 including combining data from the USB devices together so that the combined data appears to come from different endpoints for a single USB device.

18. The method of claim 17 including using a filter driver to separate the combined endpoint data so that the separated endpoint data appear as multiple data streams from the USB devices.

19. The method of claim 15 including assigning the USB devices to alternative interfaces associated with a single USB device.

* * * * *